(12) United States Patent
Gotoh et al.

(10) Patent No.: US 8,705,871 B2
(45) Date of Patent: Apr. 22, 2014

(54) FORM IMAGE MANAGING SYSTEM AND METHOD

(75) Inventors: Tomonori Gotoh, Kawasaki (JP); Tsutomu Togo, Kawasaki (JP); Yosuke Arimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 13/176,059

(22) Filed: Jul. 5, 2011

(65) Prior Publication Data

US 2012/0106855 A1   May 3, 2012

(30) Foreign Application Priority Data

Oct. 28, 2010   (JP) .................................. 2010-242685

(51) Int. Cl.
*G06K 9/62*   (2006.01)
(52) U.S. Cl.
USPC ........................................... 382/209; 382/224
(58) Field of Classification Search
USPC ................................................. 382/209, 224
See application file for complete search history.

(56) References Cited

U.S. PATENT DOCUMENTS

| | | | | |
|---|---|---|---|---|
| 5,929,913 | A * | 7/1999 | Etoh ........................ | 375/240.11 |
| 7,010,178 | B2 * | 3/2006 | Moroo ......................... | 382/313 |
| 8,050,576 | B2 * | 11/2011 | Yasukawa et al. .............. | 399/27 |
| 8,345,300 | B2 * | 1/2013 | Ishigaki ........................ | 358/1.18 |
| 2005/0286637 | A1 * | 12/2005 | Nakamura et al. ....... | 375/240.16 |
| 2009/0109479 | A1 | 4/2009 | Kato | |
| 2011/0091065 | A1 * | 4/2011 | Chandrashekar et al. .... | 382/100 |
| 2012/0106855 | A1 * | 5/2012 | Gotoh et al. .................. | 382/224 |

FOREIGN PATENT DOCUMENTS

| | | |
|---|---|---|
| JP | 10-162087 | 6/1998 |
| JP | 11-175701 | 7/1999 |
| JP | 2004-287682 | 10/2004 |
| JP | 2009-110387 | 5/2009 |

* cited by examiner

*Primary Examiner* — Gregory M Desire
(74) *Attorney, Agent, or Firm* — Staas & Halsey LLP

(57) ABSTRACT

A form image managing system includes a master image storing unit configured to store a plurality of types of master images, a obtaining unit configured to obtain a form image, a searching unit configured to search the master image storing unit for a master image having the highest correlation with the form image obtained by the obtaining unit among the plurality of types of master images, a generating unit configured to generate differential data of the form image, obtained by the obtaining unit, from the master image searched by the searching unit, and a differential data storing unit configured to associate identification information for identifying the master image searched by the searching unit from the plurality of types of master images stored in the master image storing unit with the differential data generated by the generating unit, and to store the identification information and the differential data.

17 Claims, 6 Drawing Sheets

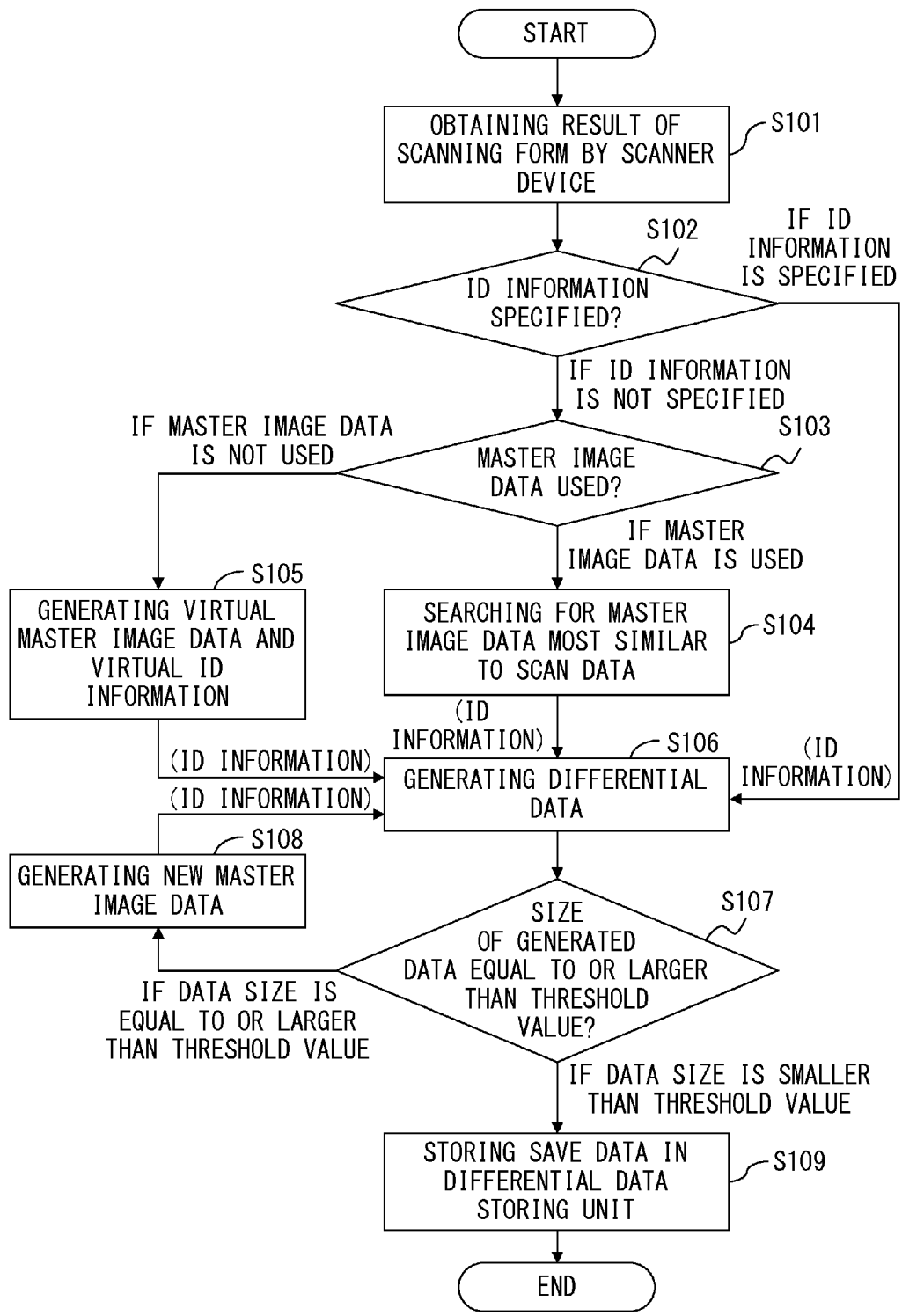
F I G. 5

FORM IMAGE MANAGING SYSTEM AND METHOD

CROSS-REFERENCE TO RELATED APPLICATION

This application is based upon and claims the benefit of priority of the prior Japanese Patent Application No. 2010-242685, flied on Oct. 28, 2010, the entire contents of which are incorporated herein by reference.

FIELD

The embodiment(s) discussed herein is (are) related to an image information management technique.

BACKGROUND

A form managing system for reading a paper form with an image scanner device, for putting the paper form image into an electronic document, and for saving the obtained form image data as trail information is known. In such a form managing system, the capacity of storage for saving form image data becomes huge, leading to an increase in system cost and complexity of system operations. Accordingly, the amount of form image data saved in a storage device needs to be reduced. In the meantime, an image quality of a level available as trail information is needed for an image of an original form reproduced from saved form image data.

The amount of form image data is reduced by being compressed with a still image compression technique such as a JPEG (Joint Photographic Experts Group) method. However, it is a serious problem that a storage capacity of recent form managing systems has become huge, and a data compression rate that can be obtained by applying a still image compression technique is not fully effective as measures against this problem under present circumstances.

In the meantime, as another technique for reducing the amount of form image data, a technique for generating a differential image between a known form image where data is not written and an image of the form to which data has been written, and for recording the differential image data with a recording device is known.

Additionally, a technique for reducing the amount of information of a differential image generated as described above is known. With this technique, a character region and other regions in a script image of an electronic document are initially identified. Next, a character region and other regions of an image superposed by being handwritten on the electronic document are identified. Then, the amount of displacement between each of the regions in the script image and each of the regions in the handwritten superposed image is detected, and a differential process is executed by correcting a corresponding position based on the detected amount of displacement, thereby preventing the differential process from being incomplete. However, this technique is a technique of merely recording only handwriting, and is not suitable for the usage of handling recorded data as trail information that is needed to guarantee the originality of the image. Moreover, this technique needs complicated process steps of initially identifying a character region and other regions of two images in order to reduce the amount of differential image data, of obtaining the amount of displacement of the two images based on identification results, and of generating a differential image after aligning the images.

In addition, a form management technique is known. With this technique, a print medium on which an image of a selected form and a barcode indicating a storage position name are printed is output when the name of the form is selected, and the image of the form is stored in the storage position indicated by the barcode when the image to which data has been written is input to the print medium.

Furthermore, a form creation technique is known. With this technique, a form ID of a created form is generated from a template ID created from a form template, and a form data ID created from overlaying form data, and a form template and form data of the created form are managed to be identifiable.

Techniques referred to in the following documents are known.

Document 1:
Japanese Laid-open Patent Publication No. H11-175701
Document 2:
Japanese Laid-open Patent Publication No. 2004-287682
Document 3:
Japanese Laid-open Patent Publication No. H10-162087
Document 4:
Japanese Laid-open Patent Publication No. 2009-110387

SUMMARY

According to an aspect of the embodiment, a form image managing system includes: a master image storing unit configured to store a plurality of types of master images; a form image obtaining unit configured to obtain a form image; a highly correlated master image searching unit configured to search the master image storing unit for a master image having the highest correlation with the form image obtained by the form image obtaining unit among the plurality of types of master images; a differential data generating unit configured to generate differential data of the form image, obtained by the form image obtaining unit, from the master image searched by the highly correlated master image searching unit; and a differential data storing unit configured to associate identification information for identifying the master image, searched by the highly correlated master image searching unit, from the plurality of types of master images stored in the master image storing unit with the differential data generated by the differential data generating unit, and to store the identification information and the differential data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a flowchart illustrating contents of a form image storage control process.

DESCRIPTION OF EMBODIMENTS

Preferred embodiments of the present invention will be explained with reference to accompanying drawings.

The meaning of the word "form" is initially defined. The word "form" means the generic name of ledgers or slips used for various types of paperwork or accounting procedures. However, in this application, the word "form" means normal paper sheets such as test papers used for various types of tests, ballot papers used for elections, on which a predetermined style image is printed in advance and to which information is added by being handwritten, sealed, printed or the like in addition to the above described normal meaning.

Figure 1:
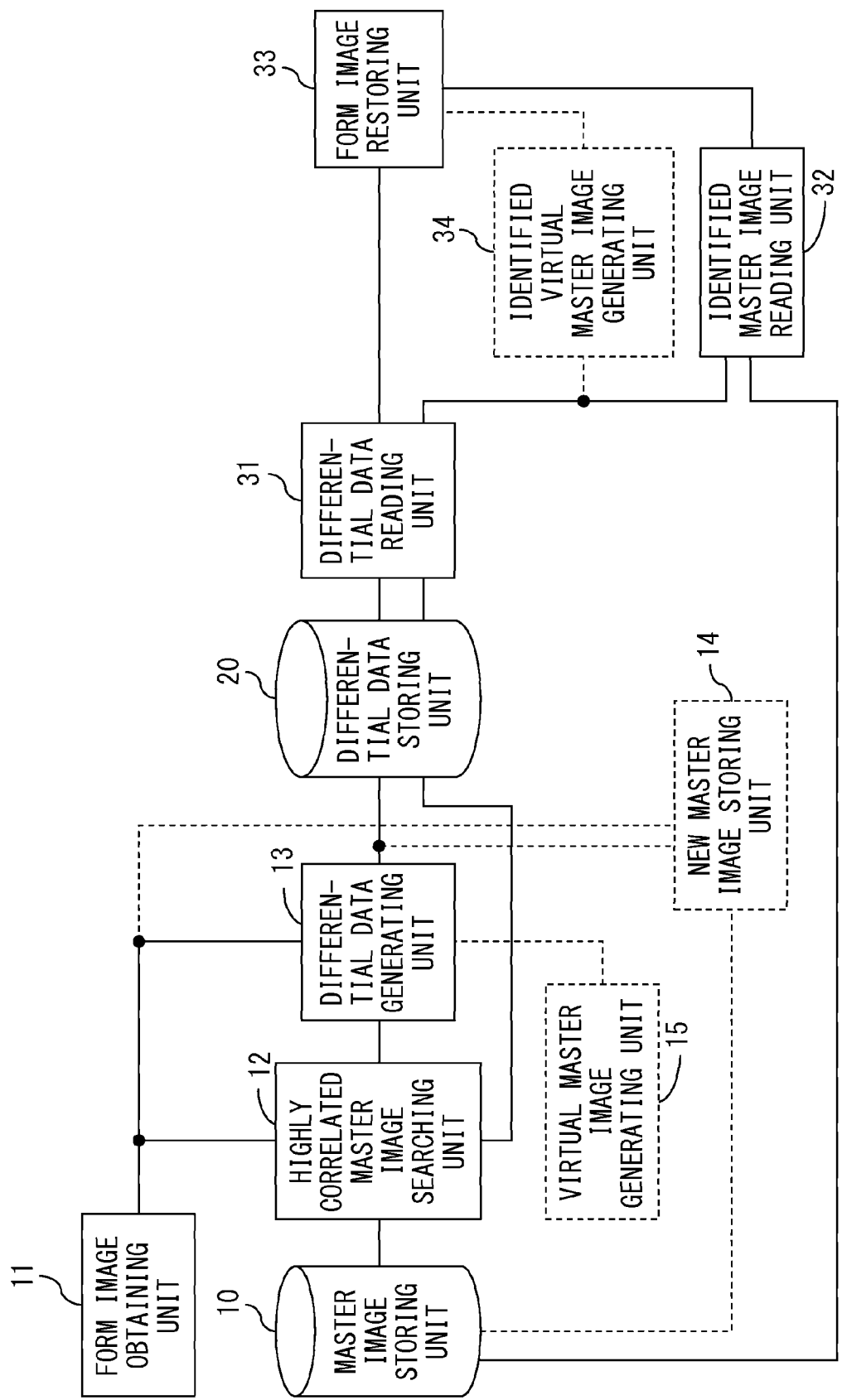
FIG. 1 is a block diagram illustrating functions of one embodiment of a form image managing system.

FIG. 1 is described first. FIG. 1 is a block diagram illustrating functions of one embodiment of a form image managing system.

This form image managing system includes a master image storing unit 10, a form image obtaining unit 11, a highly correlated master image searching unit 12, a differential data generating unit 13 and a differential data storing unit 20.

The master image storing unit 10 is a storing unit configured to store a plurality of types of master images. In this embodiment, a master image is an image of a form where a predetermined style image is printed in advance before information is added by being handwritten, sealed, printed or the like.

The form image obtaining unit 11 obtains an image of a form, to which information has been added by being handwritten, sealed, printed or the like, from an image reading device such as an image scanner device or the like.

The highly correlated master image searching unit 12 searches the master image storing unit 10 for an image having the highest correlation with the form image obtained by the form image obtaining unit 11 among the plurality of types of master images stored in the master image storing unit 10.

The differential data generating unit 13 executes an image process for generating differential data of the form image, obtained by the form image obtaining unit 11, from the master image searched by the highly correlated master image searching unit 12.

The differential data storing unit 20 associates identification information for identifying the master image searched by the highly correlated master image searching unit 12 from the plurality of types of master images stored in the master image storing unit 10 with the differential data generated by the differential data generating unit 13, and stores the identification information and the differential data.

In the form image managing system having the above described configuration, a master image having the highest correlation with a form image obtained by the form image obtaining unit 11 is selected from among a plurality of types of prepared master images. Then, differential data of the form image from the selected master image is generated, stored and saved in the differential data storing unit 20. Namely, in this form image managing system, a master image highly correlated with an image of a form to be saved is selected as a target for which differential data is to be generated. Therefore, only a portion different from a master image is extracted as differential data, leading to a reduction in the amount of data to be recorded.

In this form image managing system, the differential data generating unit 13 may perform motion-compensated inter-frame prediction based on a master image searched by the highly correlated master image searching unit 12 on the basis of a form image obtained by the form image obtaining unit 11. In this case, the differential data generating unit 13 generates, as differential data, information of a motion vector and information of a motion-compensated inter-frame prediction error of the form image, obtained by the form image obtaining unit 11, from the master image searched by the highly correlated master image searching unit 12. In this case, the amount of generated differential data can be reduced without aligning the form image obtained by the form image obtaining unit 11 with the master image as described above. Specifically, both of the images are processed in block units (in predetermined image processing block units such as 4×4 pixel units, 8×8 pixel units or 16×16 pixel units).

Additionally, the differential data generating unit 13 may execute a data compression process for the generated differential data in this form image managing system. In this case, the differential data storing unit 20 stores the differential data for which the data compression process has been executed by the differential data generating unit 13.

As illustrated with a dashed line in FIG. 1, the form image managing system may further include a new master image storing unit 14, which stores, as a new master image, an image having the amount of differential data that is equal to or larger than a predetermined threshold value and generated by the differential data generating unit 13 among form images obtained by the form image obtaining unit 11 in the master image storing unit 10.

If the new master image storing unit 14 stores a new master image in the master image storing unit 10 in this way, the differential data generating unit 13 generates differential data of the form image obtained by the form image obtaining unit 11 from the new master image. Moreover, in this case, the differential data storing unit 20 associates identification information for identifying the new master image from the plurality of types of master images stored in the master image storing unit 10 with the differential data from the new master image, which is generated by the differential data generating unit 13, and stores the identification information and the differential data.

To restore the original form image from the data stored in the differential data storing unit 20 as described above, the form image managing system may include a differential data reading unit 31, an identified master image reading unit 32 and a form image restoring unit 33 as illustrated with dashed lines in FIG. 1.

The differential data reading unit 31 reads the differential data and the identification information associated with the differential data from the differential data storing unit 20 where the differential data and the identification information are associated with each other and stored.

The identified master image reading unit 32 reads, from the master image storing unit 10, the master image identified with the identification information read by the differential data reading unit 31.

The form image restoring unit 33 executes an image process for restoring the form image from the differential data read by the differential data reading unit 31 and the master image read by the identified master image reading unit 32.

Assuming that the differential data generating unit 13 generates information of a motion vector and information of a motion-compensated inter-frame prediction error as differential data by performing motion-compensated inter-frame prediction as described above, the form image restoring unit 33 performs the following operations.

Namely, in this case, the form image restoring unit 33 initially generates a prediction image by using the master image read by the identified master image reading unit 32 and the information of the motion vector included in the differential data. Next, the form image restoring unit 33 adds a prediction error to the generated prediction image by using the information of the motion-compensated inter-frame prediction error included in the differential data. Then, the form image obtained by the form image obtaining unit 11 is restored.

Additionally, as illustrated with a dashed line in FIG. 1, the form image managing system may further include a virtual master image generating unit 15. The virtual master image generating unit 15 generates a virtual master image that is a master image represented with a mathematical expression by calculating the mathematical expression. With the virtual master image, differential data from a form image can be generated and saved in the master image storing unit 10, for example, even if a master image highly correlated with the form image obtained by the form image obtaining unit 11 is not prepared in the master image storing unit 10.

For example, a totally blank image where no image is recorded is an image obtained by performing a calculation of maximizing brightness values of pixels configuring the image. Therefore, this is one example of a virtual master image. Normally, most form images have a large ratio of the entire image region to a totally blank region where no image is printed or the like. Therefore, an effect of reducing the amount of generated differential data can be expected if a blank image is used as a virtual master image.

As illustrated in FIG. 1, the form image managing system may include an identified virtual master image generating unit 34 in order to restore an original form image from differential data generated by using a virtual master image. In this case, the original form image is restored as follows.

Initially, the differential data reading unit 31 reads differential data and identification information associated with the differential data from the differential data storing unit 20 where the differential data and the identification information are stored.

The identified virtual master image generating unit 34 generates a virtual master image identified with the identification information read by the differential data reading unit 31 by performing the same calculation as that performed by the virtual master image generating unit 15.

Then, the form image restoring unit 33 executes an image process for restoring the form image from the differential data read by the differential data reading unit 31 and the virtual master image generated by the identified virtual master image generating unit 34.

Figure 2:
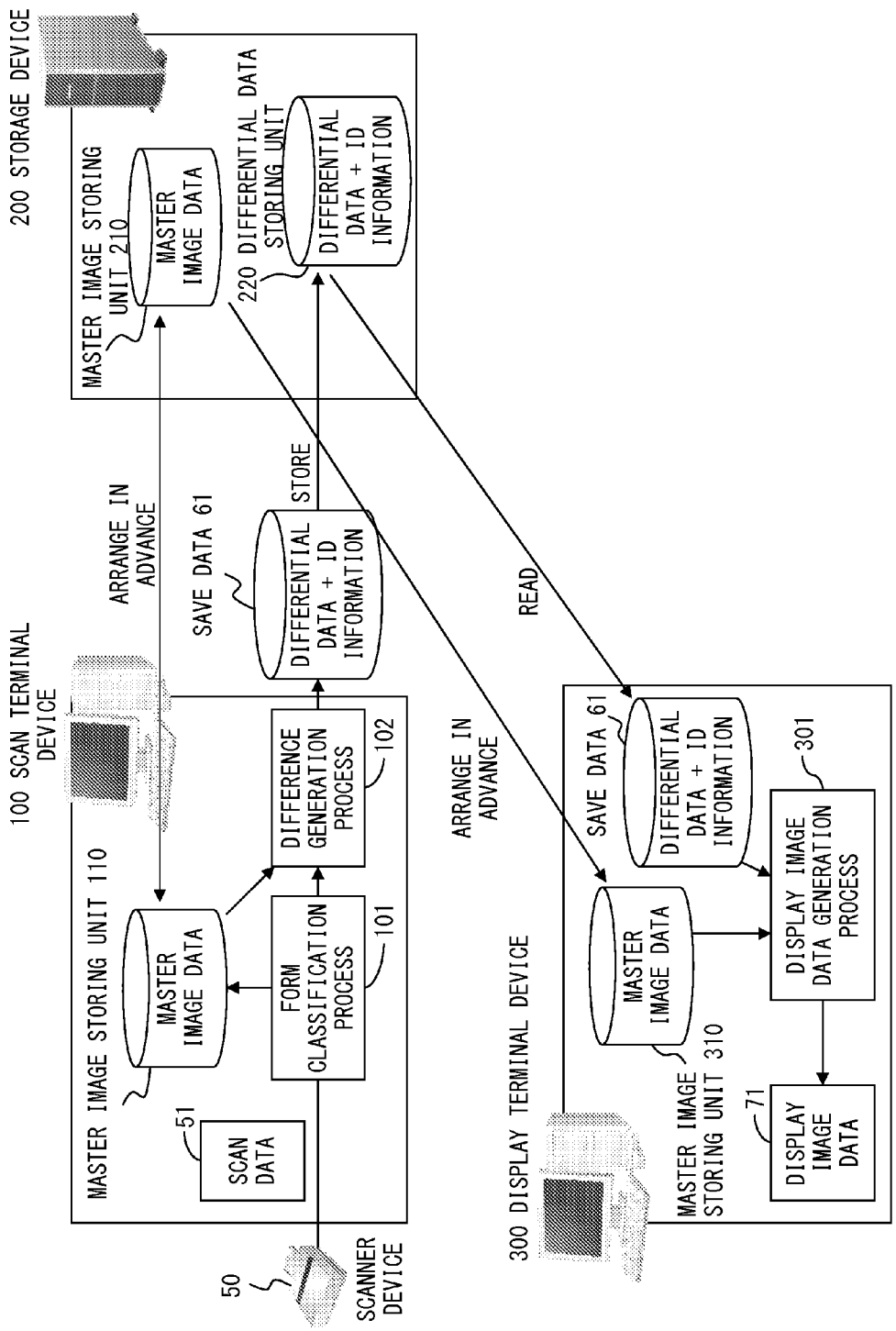
FIG. 2 illustrates a system configuration of one embodiment of the form image managing system.

FIG. 2 is described next. FIG. 2 illustrates a configuration of one embodiment of the form image managing system. The form image managing system is configured by including a scan terminal device 100, a storage device 200 and a display terminal device 300. The scan terminal device 100, the storage device 200 and the display terminal device 300 are interconnected via a communication network not illustrated, and can transmit/receive various types of data via the communication network.

The scan terminal device 100 obtains a form image, and generates data to be saved for the image. The scan terminal device 100 includes a master image storing unit 110 to which a scanner device 50 is connected.

The master image storing unit 110 is a storing unit configured to store image data of a plurality of types of master images. The image data of the master images stored in the master image storing unit 110 can be individually identified with ID (Identification Data) information that is identification information for individually identifying the respective pieces of image data. For example, a name of an image data file of a master image, and index information associated with the file name are available as the ID information. The master image storing unit 110 provides the function equivalent to the master image storing unit 10 of FIG. 1.

The scanner device 50 outputs scan data 51 that represents an image of a form by reading the form.

In the scan terminal device 100, control processes such as a form classification process 101, a difference generation process 102 and the like are executed.

The form classification process 101 is a process equivalent to the functions provided by the form image obtaining unit 11 and the highly correlated master image searching unit 12. More specifically, the form classification process 101 is a process for searching for image data of a master image most similar to the scan data 51 output from the scanner device 50 from among the plurality of types of image data stored in the master image storing unit 110.

The difference generation process 102 is a process equivalent to the function provided by the differential data generating unit 13 of FIG. 1. More specifically, in the difference generation process, a process for generating differential data of the scan data 51 output from the scanner device 50 from image data of a master image read from the master image storing unit 110 by the form classification process 101 is initially executed. Then, a process for generating save data 61 by associating the generated differential data with ID information that is identification information for identifying the image data of the master image read from the master image storing unit 110 by the form classification process 101, and for transmitting the generated data to the storage device 200 is executed. The save data 61 represents the form image read by the scanner device 50, and is data stored and saved in the storage device 200 as a replacement for the scan data 51 output from the scanner device 50.

The storage device 200 stores and saves data to be saved of the form image, which is generated by the scan terminal device 100. The storage device 200 includes a master image storing unit 210 and a differential data storing unit 220.

The master image storing unit 210 is a storing unit configured to store image data of a plurality of types of master images. In the master image storing unit 110 of the scan terminal device 100, the master image storing unit 210 of the storage device 200 and a master image storing unit 310 to be described later of the display terminal device 300, image data of the same master images are arranged in advance. Moreover, if image data of a new master image is stored in the master image storing unit 110 as will be described later in the scan terminal device 100, the same master image data is also stored in the master image storing units 210 and 310. The master image storing units 110, 210 and 310 provide the function equivalent to the master image storing unit 10 of FIG. 1.

In this embodiment, if the same master images are pre-stored in the master image storing unit 110 of the scan terminal device 100 and the master image storing unit 310 of the display terminal device 300, the master image storing unit 210 of the storage device 200 is not essential.

The differential data storing unit 220 stores and saves the save data 61 transmitted from the scan terminal device 100. The differential data storing unit 220 provides the function equivalent to the differential data storing unit 20 of FIG. 1.

The display terminal device 300 reads the data saved in the storage device 200, and restores and displays the image of the original form represented with the read data. This display terminal device 300 includes the master image storing unit 310.

The master image storing unit 310 is a storing unit configured to store image data of a plurality of types of the same master images as those of the master image storing units 110 and 210. The image data of the master images stored in the master image storing unit 310 can be individually identified by using the same ID information as those used to identify the image data of the master images stored in the master image storing unit 110.

In the display device 300, control processes such as a display image data generation process 301 and the like are executed.

The display image data generation process 301 is a process equivalent to the functions provided by the differential data reading unit 31, the identified master image reading unit 32, and the form image restoring unit 33, which are illustrated in FIG. 1. Namely, in the display image data generation process 301, a process for reading the save data 61 from the differential data storing unit 220 of the storage device 200 is initially executed. Next, a process for reading image data of a master image identified with ID information included in the save data 61 from the master image storing unit 310 is executed. Then, a process for generating display image data 71 that represents an image by restoring the form image read by the scanner device 50 from the differential data included in the save data 61 and the image data of the master image read from the master image storing unit 310 is executed.

The functions of the blocks in the system illustrated in FIG. 1, and the scan terminal device 100, the storage device 200 and the display terminal device 300, which are included in the form image managing system of FIG. 2, can be configured by using a computer having a standard hardware configuration.

Figure 3:
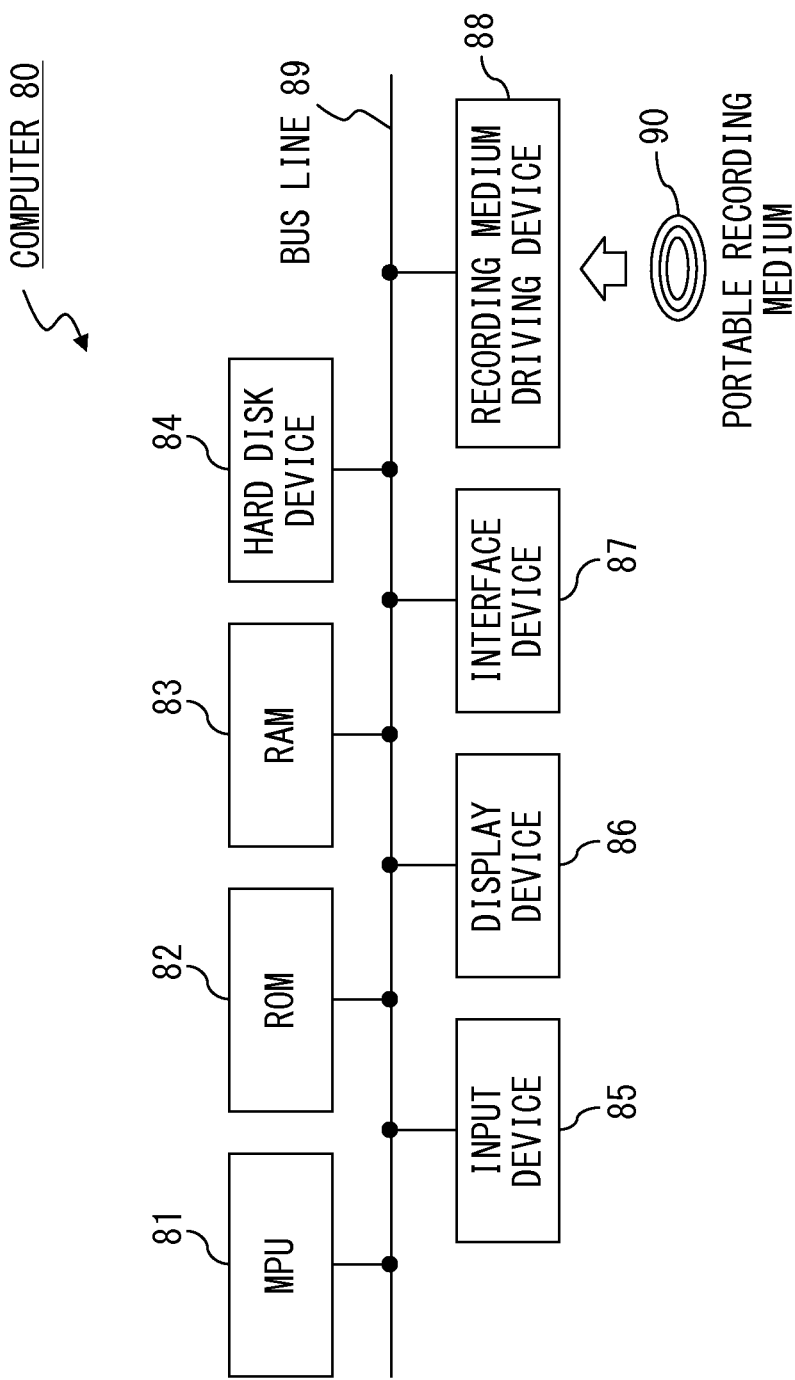
FIG. 3 illustrates a configuration of one example of a computer available to the form image managing system.

FIG. 3 is described here. FIG. 3 illustrates a configuration of one example of a computer available to the form image managing system of FIG. 2.

The computer 80 includes an MPU 81, a ROM 82, a RAM 83, a hard disk device 84, an input device 85, a display device 86, an interface device 87, and a recording medium driving device 88. These components are interconnected via a bus line 89, and can mutually transmit/receive various types of data under the control of the MPU 81.

The MPU (Micro Processing Unit) 81 is a processor for controlling operations of the entire computer 80, and functions as a control processing unit of the computer 80.

The ROM (Read Only Memory) 82 is a read-only semiconductor memory where a predetermined basic control program is prerecorded. The MPU 81 reads and executes the basic control program at startup of the computer 80, whereby operations of the components of the computer 80 can be controlled.

The RAM (Random Access Memory) 83 is a semiconductor memory which is used as a working storage area as needed when the MPU 81 executes various types of control programs, and to/from which a write and a read can be performed on demand.

The hard disk device 84 is a storage device for storing various types of control programs executed by the MPU 81, and various types of data. The MPU 81 can execute various types of control processes to be described later by reading and executing a predetermined control program stored in the hard disk device 84. If this computer 80 is used as the storage device 200 of FIG. 2, the hard disk device 84 is used also as the master image storing unit 210 and the differential data storing unit 220. Alternatively, if this computer 80 is used as the scan terminal device 100 or the display terminal device 300 of FIG. 2, the hard disk device 84 is used also as the master image storing unit 110 or 310.

The input device 85 is, for example, a mouse device or a keyboard device. When operated by a user of the system illustrated in FIG. 2, the input device 85 obtains inputs of various types of information respectively associated with contents of operations, and transmits the obtained input information to the MPU 81.

The display device 86 is, for example, a liquid crystal display. The display device 86 displays various types of texts and images according to display data transmitted from the MPU 81. For example, if this computer 80 is used as the display terminal device 300 of FIG. 2, a restored image, represented with display image data 71 restored by the display image data generation process 301, of a form read by the scanner device 50 is displayed.

The interface device 87 manages transmissions/receptions of various types of information among various types of devices connected to the computer 80. More specifically, the interface device 87 manages transmissions/receptions, performed via a communication network among the scan terminal device 100, the storage device 200 and the display terminal device 300, which are illustrated in FIG. 2, of various types of data such as master image data, the above described save data 61 and the like. Alternatively, if this computer 80 is used as the scan terminal device 100 of FIG. 2, the interface device 87 receives the scan data 51 output from the scanner device 50, and transmits the received data to the MPU 81.

The recording medium driving device 88 is a device for reading various types of control programs and data recorded on a portable recording medium 90. The MPU 81 can be made to also execute various types of control processes to be described later by reading and executing a predetermined control program recorded on the portable recording medium 90 via the recording medium driving device 88. Examples of the portable recording medium 90 include a flash memory having a USB (Universal Serial Bus) standard connector, a CD-ROM (Compact Disc-Read Only Memory), a DVD-ROM (Digital Versatile Disk-Read Only Memory) and the like.

To configure the scan terminal device 100, the storage device 200 and the display terminal device 300 by using such a computer 80, for example, a control program for causing the MPU 81 to execute the various types of control processes to be described later is created. The created control program is pre-stored in the hard disk device 84 or on the portable recording medium 90. Then, a predetermined instruction is issued to the MPU 81, which is caused to read and execute the control program. In this way, the functions respectively possessed by the scan terminal device 100, the storage device 200 and the display terminal device 300 are provided by the MPU 81. Accordingly, the computer 80 functions as the scan terminal device 100, the storage device 200 and the display terminal device 300.

Figure 4:
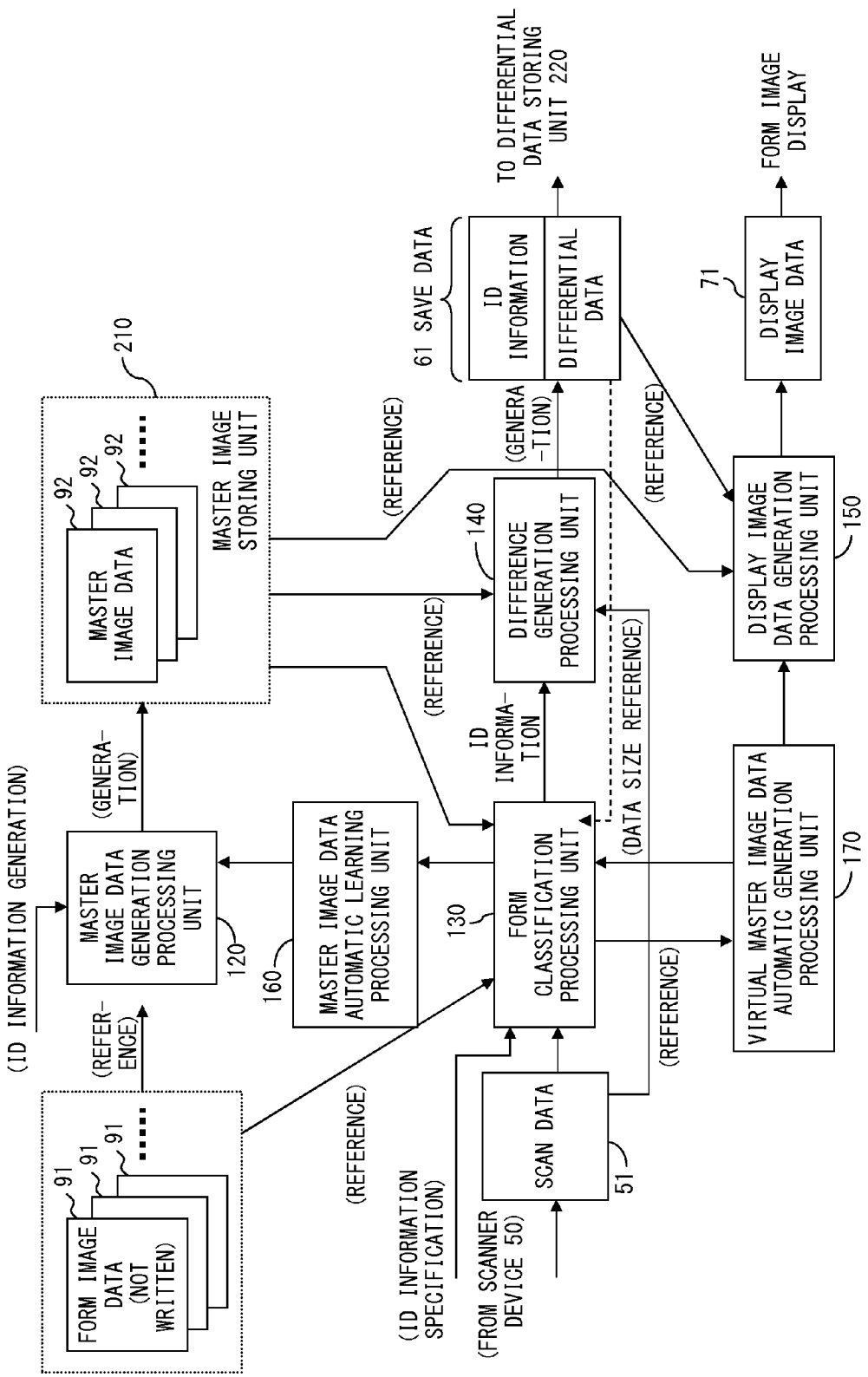
FIG. 4 is a block diagram illustrating details of the functions of the form image managing system illustrated in FIG. 2.

FIG. 4 is described next. FIG. 4 is a block diagram illustrating details of the configuration of the form image managing system of FIG. 2. The computer 80 having the configuration of FIG. 3 can be made to provide the functions of the blocks.

In FIG. 4, for simplicity of explanation, the master image storing units 110, 210 and 310, in which the same master image data and information for identifying master images are stored as described above, are generically called the "master image storing unit 210".

The computer 80 provides the functions of a master image data generation processing unit 120, a form classification processing unit 130, a difference generation processing unit 140, a display image data generation processing unit 150, a master image data automatic learning processing unit 160 and a virtual master image data automatic generation processing unit 170. In this embodiment, the master image data generation processing unit 120, the form classification processing unit 130, the difference generation processing unit 140 and the master image data automatic learning processing unit 160 are included in the scan terminal device 100 illustrated in FIG. 2. Moreover, the display image data generation processing unit 150 is included in the display terminal device 300 illustrated in FIG. 2. The virtual master image data automatic generation processing unit 170 is included in the scan terminal device 100 and the display terminal device 300, which are illustrated in FIG. 2.

The master image data generation processing unit 120 executes a process for storing image data of a plurality of types of forms (form image data 91) before information is added (that is, not written) by being handwritten or the like along with information for identifying each of the images (master images) in the master image storing unit 210 as master image data 92. If image data of a new master image is received from the master image data automatic learning processing unit 160 to be described later, the master image data generation processing unit 120 executes a process for newly storing the received image data in the master image storing unit 210 as the master image data 92. As described above, the master image storing unit 210 provides the function equivalent to the master image storing unit 10 illustrated in FIG. 1.

The form classification processing unit 130 is a processing unit configured to execute the form classification process 101 of FIG. 2. More specifically, the form classification processing unit 130 executes the following processes.

Initially, the form classification processing unit 130 executes a process for obtaining scan data 51 that is output from the scanner device 50 and represents an image of a form to which information has been added (written) by being handwritten or the like.

Additionally, the form classification processing unit 130 executes a process for selecting an image most similar to the form image represented with the scan data 51 obtained from the scanner device 50 from among images of a plurality of types of forms for which master image data 92 are respectively stored in the master image storing unit 210. Specifically, this process is executed as follows.

Initially, the form classification processing unit 130 executes a process for calculating a mutual correlation coefficient between each of pieces of the master image data 92 and the scan data 51 in an array that represents pixel values of pixels configuring the image. Then, the form classification processing unit 130 executes a process for selecting master image data 92 by which a coefficient indicating the maximum positive correlation is obtained in the mutual correlation coefficient calculation process. In this way, the image most similar to the form image represented with the scan data 51 is selected.

Note that the form classification processing unit 130 may execute the above described selection process by using another technique.

The form classification processing unit 130 executes a process for obtaining ID information that is information for identifying thus selected master image data 92 from the master image storing unit 210, and for transmitting the obtained information to the difference generation processing unit 140.

Upon receipt of an input of specifying ID information for identifying the master image from the user of the system, the form classification processing unit 130 executes a process for transmitting the received ID information unchanged to the difference generation processing unit 140 without executing the above described selection process.

Additionally, the form classification processing unit 130 executes a process for obtaining a size of the save data 61 generated by the difference generation processing unit 140 to be described later, and for determining whether or not the data size is equal to or larger than a predetermined threshold value. If the data size is equal to or larger than the predetermined threshold value, the form classification processing unit 130 executes a process for starting an operation to be described later by giving a predetermined instruction and the scan data 51 corresponding to the save data 61 to the master image data automatic learning processing unit 160.

In the meantime, the form classification processing unit 130 sometimes receives, from the user of the system, an input of an instruction not to use the master image data 92 stored in the master image storing unit 210. Alternatively, none of master image data 92 is stored in the master image storing unit 210 in some cases. In such cases, the form classification processing unit 130 executes a process for starting an operation to be described later by giving a predetermined instruction to the virtual master image data automatic generation processing unit 170. The form classification processing unit 130 executes a process for transferring, to the difference generation processing unit 140, virtual master image data that is generated and transmitted by the virtual master image data automatic generation processing unit 170 in response to this instruction, and the ID information that is information for identifying the image corresponding to the virtual master image data.

The difference generation processing unit 140 is a processing unit configured to execute the difference generation process 102 of FIG. 2. More specifically, the difference generation processing unit 140 executes the following processes.

Initially, the difference generation processing unit 140 executes a process for obtaining, from the scanner device 50, the same scan data 51 as that obtained by the form classification processing unit 130.

Additionally, the difference generation processing unit 140 executes a process for receiving the ID information that is information for identifying the master image and transmitted from the form classification processing unit 130, and for reading, from the master image storing unit 210, the master image data 92 corresponding to the ID information that is the information for identifying the master image by referencing the master image storing unit 210. The difference generation processing unit 140 executes a process for receiving virtual master image data if the virtual master image data is transmitted from the form classification processing unit 130 without executing the read process from the master image storing unit 210. In subsequent processes, the received virtual master image data is used as a replacement for the master image data 92 read from the master image storing unit 210.

Next, the difference generation processing unit 140 executes a process for generating differential data of the scan data 51, obtained from the scanner device 50, from the master image data 92 read from the master image storing unit 210 (or the above described virtual master image data). Specifically, this process is executed as follows.

Initially, the difference generation processing unit 140 executes a motion-compensated inter-frame prediction process based on the master image, represented with the master image data 92 read from the master image storing unit 210, for the form image represented with the scan data 51 obtained from the scanner device 50. The motion-compensated inter-frame prediction process is executed, for example, as follows.

Initially, a process for partitioning each of image regions of the form image and the master image into a plurality of elements of a predetermined size is executed. Next, a process for obtaining a motion direction and a motion amount of each of the elements based on the assumption that the master image moves to generate the form image is executed. Then, a process for obtaining a motion vector in the move from the master image to the form image based on the obtained motion direction and motion amount is executed. Next, a process for creating a prediction image of the form based on the motion vector by moving the master image according to the obtained motion vector is executed. Lastly, a process for obtaining a motion-compensated inter-frame prediction error by calculating a difference between the created prediction image and the form image is executed.

The difference generation processing unit 140 executes a process for generating information of the motion vector and information of the motion-compensated inter-frame prediction error, which are obtained with the motion-compensated inter-frame prediction process, as differential data of the above described form image from the above described master image. Generation of the differential data is performed in this way.

Next, the difference generation processing unit 140 executes a process for generating save data 61 by associating the generated differential data with ID information that is the information for identifying the master image and received from the form classification processing unit 130, for transmitting the generated save data 61 to the storage device 200, and for storing the data in the differential data storing unit 220. If the difference generation processing unit 140 has generated the differential data by using the virtual master image data, it executes a process for generating the save data 61 by associating the differential data with ID information that is attached to the virtual master image data and is the information for identifying the master image, and for storing the data in the differential data storing unit 220. As described above, the differential data storing unit 220 provides the function equivalent to the differential data storing unit illustrated in FIG. 1.

Note that the difference generation processing unit 140 may execute a data compression process for the generated differential data, and a process for generating the save data 61 by associating the differential data for which the compression process has been executed with the ID information that is the information for identifying the master image, and for storing the generated data in the differential data storing unit 220. A compression method and a data compression rate of the data compression process may be arbitrarily selected. In this embodiment, however, it is preferable to select the compression method and the data compress rate by taking it into account that a subsequently restored image of a form image needs to have an image quality of a level sufficiently available as trail information.

Additionally, the difference generation processing unit 140 executes the following processes if new master image data 92 is stored in the master image storing unit 210 by the master image data generation processing unit 120.

Initially, the difference generation processing unit 140 executes a process for generating differential data of the scan data 51, obtained from the scanner device 50, from the new master image data 92. Then, the difference generation processing unit 140 executes a process for generating the save data 61 by associating the generated differential data with ID information for identifying the new master image data 92, and for storing the generated save data 61 in the differential data storing unit 220.

The display image data generation processing unit 150 is a processing unit configured to execute the display image data generation process 301 of FIG. 2. More specifically, the display image data generation processing unit 150 executes the following processes.

Initially, the display image data generation processing unit 150 executes a process for reading, from the differential data storing unit 220, the save data 61 identified with a predetermined instruction by referencing the differential data storing unit 220 of the storage device 200 upon receipt of an input of the predetermined instruction issued from the user of the system. If the data compression process has been executed for differential data included in the read save data 61, a data expansion process is executed for the differential data to restore the original differential data.

Next, the display image data generation processing unit 150 executes a process for reading, from the master image storing unit 210, master image data 92 identified with ID information included in the save data 61 read from the differential data storing unit 220.

Note that the ID information included in the save data 61 read from the differential data storing unit 220 is sometimes information for identifying virtual master image data generated by the virtual master image data automatic generation processing unit 170. In this case, the display image data generation processing unit 150 executes a process for starting an operation to be described later by giving a predetermined instruction to the virtual master image data automatic generation processing unit 170. Then, a process for obtaining virtual master image data that is generated and transmitted by the virtual master image data automatic generation processing unit 170 in response to the instruction is executed. In subsequent processes, the received virtual master image data is used as a replacement for the master image data 92 read from the master image storing unit 210.

Next, the display image data generation processing unit 150 executes a process for restoring the image of the original form from the differential data included in the read save data 61, and the master image data 92 read from the master image storing unit 210 (or the above described virtual master image data). Specifically, this process is executed as follows.

Initially, the display image data generation processing unit 150 executes a process for generating the same prediction image as that generated with the motion-compensated inter-frame prediction process executed by the difference generation processing unit 140. This prediction image can be generated by using the master image data 92 read from the master image storing unit 210 (or the above described virtual master image data), and information of a motion vector in the differential data included in the read save data 61.

Next, the display image data generation processing unit 150 executes a process for adding, to the generated prediction image, a predicted error represented in the motion-compensated inter-frame prediction error information included in the differential data of the read save data 61. With this process, display image data 71 is generated.

Next, the display image data generation processing unit 150 executes a process for causing the display device 86 included in the display terminal device 300 to display the restored image, represented with the display image data 71 obtained as described above, of the form image obtained with the scanner device 50.

Upon receipt of the above described predetermined instruction from the form classification processing unit 130, the master image data automatic learning processing unit 160 executes a process for transferring, to the master image data generation processing unit 120, the scan data 51 received along with the instruction as image data of a new master image.

Upon receipt of the above described predetermined instruction from the form classification processing unit 130, the virtual master image data automatic generation processing unit 170 executes a process for generating virtual master image data that is a master image represented with a mathematical expression by calculating the mathematical expression. In this embodiment, the virtual master image data automatic generation processing unit 170 executes a process for generating image data of the above described totally blank image where no image is recorded by performing a calculation of maximizing all brightness values of pixels configuring the image. Thereafter, the virtual master image data automatic generation processing unit 170 executes a process for associating thus generated virtual master image data with ID information for identifying the virtual master image data from other master image data, and for transmitting the data to the form classification processing unit 130.

Additionally, the virtual master image data automatic generation processing unit 170 executes a process for similarly generating the same virtual master image as that generated in response to an instruction issued from the form classification processing unit 130 upon receipt of the above described process instruction from the display image data generation processing unit 150. Thereafter, the virtual master image data automatic generation processing unit 170 executes a process for transmitting thus generated virtual master image data to the display image data generation processing unit 150.

The units of the form image managing system illustrated in FIG. 4 respectively provide the above described functions. Accordingly, the functions equivalent to the form image obtaining unit 11 and the highly correlated master image searching unit 12, which are illustrated in FIG. 1, are provided by the form classification processing unit 130 of FIG. 4. Moreover, the function equivalent to the differential data generating unit 13 of FIG. 1 is provided by the difference generation processing unit 140. Additionally, the functions equivalent to the differential data reading unit 31, the identified master image reading unit 32 and the form image restoring unit 33, which are illustrated in FIG. 1, are provided by the display image data generation processing unit 150 of FIG. 4. Furthermore, the function equivalent to the new master image storing unit 14 of FIG. 1 is provided by the master image data generation processing unit 120, the form classification processing unit 130 and the master image data automatic learning processing unit 160, which are illustrated in FIG. 4. Still further, the functions equivalent to the virtual master image generating unit 15 and the identified virtual master image generating unit 34, which are illustrated in FIG. 1, are provided by the virtual master image data automatic generation processing unit 170 of FIG. 4.

FIG. 5 is described next. FIG. 5 is a flowchart illustrating contents of a form image storage control process executed by the MPU 81 when the computer 80 of FIG. 3 is used as the scan terminal device 100 in the form image managing system of FIG. 2.

The process of FIG. 5 is started when the MPU 81 detects that a user of the scan terminal device 100 has input a predetermined process start instruction via the input device 85. Assume that the process for storing the master image data 92 in the master image storing units 110, 210 and 310 has been complete before this process is started. Also assume that the master image data 92 is read from the master image storing unit 110 if the master image data 92 is used in the process of FIG. 5. Further assume that the master image data 92 is also stored in the other master image storing units 210 and 310 by storing the master image data 92 in the master image storing unit 110 in the process of FIG. 5.

In FIG. 5, processes of S101 to S104 are processes executed by the form classification processing unit 130 in the configuration of FIG. 4.

Initially, in S101, the process for obtaining scan data 51 that is output from the scanner device 50 and represents a form image to which information has been added (written) by being handwritten or the like. By executing this process, the function equivalent to the form image obtaining unit 11 of FIG. 1 is provided.

Next, in S102, the process for determining whether or not an input of ID information for specifying a master image has been received from the user of the scan terminal device 100 via the input device 85 is executed. If it is determined in this determination process that the input of specifying the master image by using the ID information has been received, the flow goes to S106. Alternatively, if it is determined in this determination process that the input of specifying the master image by using the ID information has not been received, the flow goes to S103.

Next, in S103, the process for determining whether or not to generate save data 61 of the form image by using the master image data 92 stored in the master image storing unit 110 is executed.

In this embodiment, it is determined in the determination process of S103 to generate the save data 61 without using the master image data 92 if none of the master image data 92 is stored in the master image storing unit 110. Also if an instruction not to use the master image data 92 is received from the user of the scan terminal device 100 via the input device 85, it is determined in the determination process of S103 to generate the save data 61 without using the master image data 92. Otherwise, it is determined in the determination process of S103 to generate the save data 71 by using the master image data 92.

If it is determined in the determination process of S103 to generate the save data 61 by using the master image data 92, the flow goes to S104. Alternatively, if it is determined in the determination process of S103 to generate the save data 61 without using the master image data 92, the flow goes to S105.

In S104, the process for searching the master image storing unit 110 for the master image data 92 most similar to the form image represented with the scan data 51 obtained with the process of S101 is executed. Specifically, in this process, a process for calculating a mutual correlation coefficient between each of pieces of the master image data 92 and the scan data 51 in an array that represents pixel values of pixels configuring the image is initially executed as the operation performed by the form classification processing unit 130 as described above. Next, a process for selecting the master image data 92 by which a coefficient that represents the maximum positive correlation is obtained from the master image storing unit 110, and for obtaining ID information corresponding to the master image data 92 is executed.

By executing the process of S104, the function equivalent to the highly correlated master image searching unit 12 of FIG. 1 is provided. Upon completion of the process of S104, the flow goes to S106.

In the meantime, in S105, a process for generating virtual master image data, and for generating ID information for identifying the virtual master image data from other master image data is executed. This process is a process executed by the virtual master image data automatic generation processing unit 170 in the configuration of FIG. 4. This is a process for generating virtual master image data that is a master image represented with a mathematical expression by calculating the mathematical expression. By executing this process, the function equivalent to the virtual master image generating unit 15 of FIG. 1 is provided. Upon completion of the process of S105, the flow goes to S106.

In S106, a differential data generation process is executed. This is a process executed by the difference generation processing unit 140 in the configuration of FIG. 4. More specifically, the process is executed as follows.

Initially, a process for reading, from the master image storing unit 110, the master image data 92 corresponding to the ID information obtained by executing the process of S104 with reference to the master image storing unit 110 is executed. However, if it is determined in the determination process of S102 that an input of specifying the master image by using the ID information has been received, a process for reading, from the master image storing unit 110, the master image data 92 corresponding to the received ID information is executed instead of executing the above described process. Alternatively, if virtual master image data is generated by executing the process of S105, the generated virtual master image data is used as the master image data 92 read from the master image storing unit 110 in subsequent processes. Still alternatively, if image data of a new master image is generated by most recently executing the process of S108 to be described later, the image data of the new master image is used as the master image data 92 read from the master image storing unit 110 in the subsequent processes.

Next, the motion-compensated inter-frame prediction process based on the master image represented with the master image data 92, read from the master image storing unit 110, for the form image represented with the scan data 51 obtained with the process of S101 is executed. Then, a process for generating information of a motion vector and information of a motion-compensated inter-frame prediction error, which are obtained with this prediction process, as differential data of the aforementioned form image from the above described master image is executed.

Next, a process for generating save data 61 by associating the generated differential data with the ID information obtained with the process of S104 is executed. However, if it is determined in the determination process of S102 that the input of specifying the master image by using the ID information has been received, a process for generating the save data 61 by associating the generated differential data with the received ID information is executed. Alternatively, if virtual master image data has been generated by executing the process of S105, a process for generating the save data 61 by associating with ID information generated along with the virtual master image data when the process of S105 is executed is executed. Still alternatively, if image data of a new master image has been generated by most recently executing the process of S108 to be described later, a process for generating the save data 61 by associating with ID information generated along with the image data of the new master image when the process of S108 is executed is executed.

The process described up to this point is the differential data generation process of S106. By executing the process of S106, the function equivalent to the differential data generating unit 13 of FIG. 1 is provided.

In the process of S106, the data compression process may be executed for the generated differential data, and a process for generating the save data 61 by associating the differential data for which the compression process has been executed with the ID information, and for storing the save data 61 in the differential data storing unit 220 may be executed.

Next, in S107, a process for obtaining a size of the saved data 61 generated with the process of S106, and for determining whether or not the data size is equal to or larger than a predetermined threshold value is executed. This determination process is a process executed by the form classification processing unit 130 in the configuration of FIG. 4. If it is determined in this determination process that the data size is equal to or larger than the predetermined threshold value, the flow goes to S108. Alternatively, if it is determined in this determination process that the data size is smaller than the predetermined threshold value, the flow goes to S109.

In S108, a process for generating new master image data 92 is executed. This process is a process executed by the virtual master image data automatic generation processing unit 170 and the master image data generation processing unit 120 in the configuration of FIG. 4.

In the process of S108, a process for generating ID information for identifying scan data 51 used to generate the differential data in the process of S106 from other master image data is executed. Next, a process for generating new master image data 92 from the scan data 51 is executed. Then, a process for storing the newly generated master image data 92 and ID information in the master image storing unit 110 is executed.

The process described up to this point is the new master image data generation process of S108. By executing the processes of S107 and S108, the function equivalent to the new master image storing unit 14 of FIG. 1 is provided.

Next, in S109, a process for transmitting, to the storage device 200, the save data 61 that has been generated by most recently executing the process of S106 and includes the differential data and the ID information, and for storing the save data 61 in the differential data storing unit 220 is executed. Upon completion of this process, the form image storage control process of FIG. 5 is terminated.

The MPU 81 executes the above described form image storage control process, whereby the computer 80 of FIG. 3 operates as the scan terminal device 100, and generation of data to be saved for a form image, and saving of the data in the storage device 200 can be performed.

Figure 6:
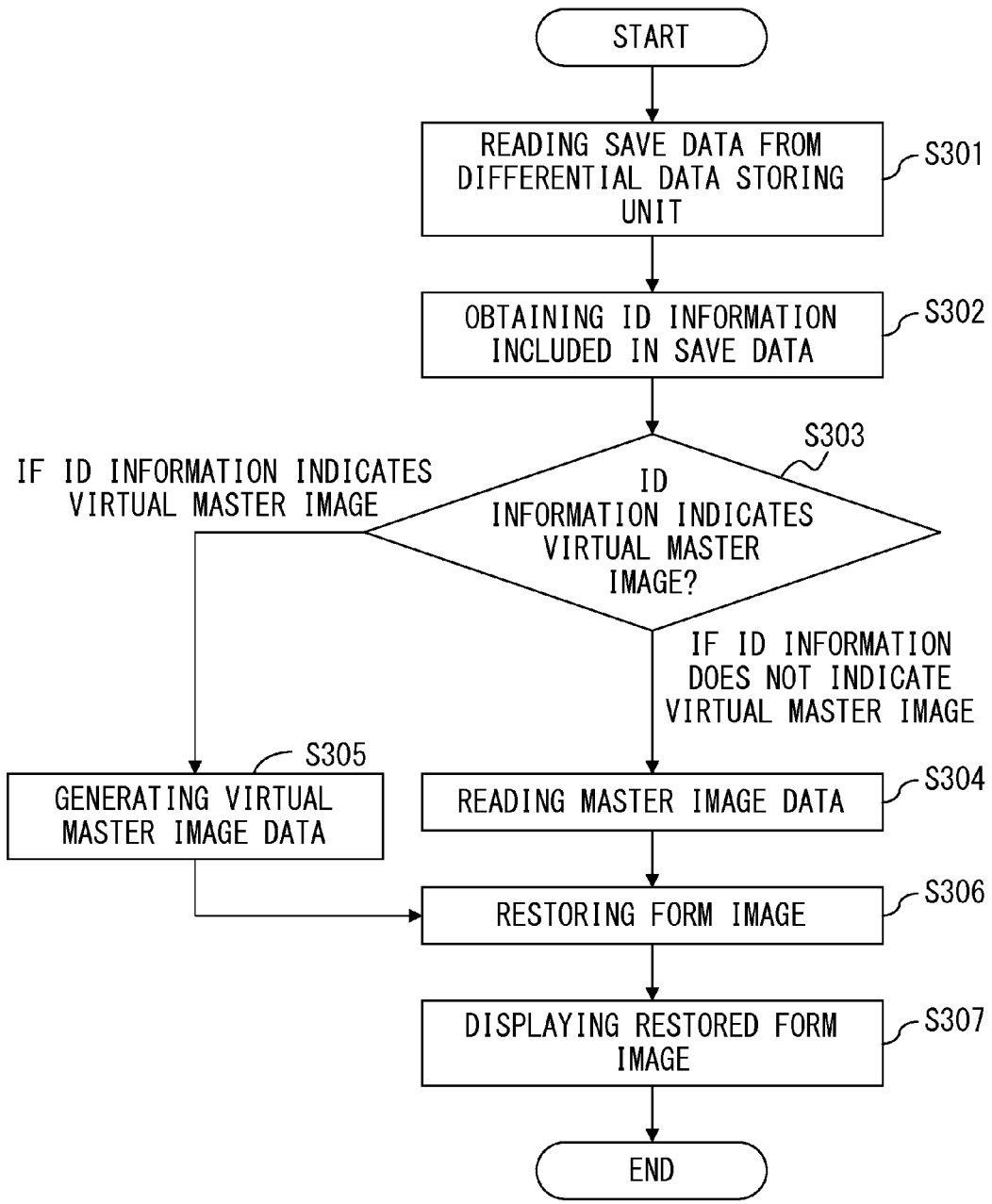
FIG. 6 is a flowchart illustrating contents of a form image display control process.

FIG. 6 is described next. FIG. 6 is a flowchart illustrating contents of a form image display control process executed by the MPU 81 when the computer 80 of FIG. 80 is used as the display terminal device 300 in the form image managing system of FIG. 2.

The process of FIG. 6 is started when the MPU 81 detects that a user of the display terminal device 300 has input information for specifying an image of a form to be displayed and a predetermined process start instruction via the input device 85. In the process of FIG. 6, master image data 92 is assumed to be read from the master image storing unit 310 if the master image data 92 is used.

Processes of steps S301 to S304 and S306 to S307 in FIG. 6 are processes executed by the display image data generation processing unit 150 in the configuration of FIG. 4, whereas a process of S305 is a process executed by the virtual master image data automatic generation processing unit 170 in the configuration of FIG. 4.

In FIG. 6, in S301, a process for reading save data 61 identified with information, input by the user of the display terminal device 300, for specifying an image of a form to be displayed by referencing the differential data storing unit 220 of the storage device 200 is initially executed. By executing this process, the function equivalent to the differential data reading unit 31 of FIG. 1 is provided. If the data compression process has been executed for differential data included in the read save data 61, the original differential data is restored by executing the data expansion process for the differential data.

Next, in S302, a process for extracting ID information included in the save data 61 from the save data 61 read from the differential data storing unit 220 by executing the process of S301 is executed.

Then, in S303, a process for determining whether or not the ID information obtained by executing the process of S302 indicates virtual master image data is executed. Here, if the ID information is determined to indicate the virtual master image data, the flow goes to S305. If the ID information is determined to indicate normal master image data (namely, not the virtual master image data), the flow goes to S304.

In S304, a process for reading, from the master image storing unit 310, master image data 92 identified with the ID information included in the save data 61 obtained by executing the process of S302 is executed. By executing this process, the function equivalent to the identified master image reading unit 32 of FIG. 1 is provided. Upon completion of the process of S304, the flow goes to S306.

In S305, a process for similarly generating the same virtual master image as that generated by executing the above described process of S105 in FIG. 5 is executed. By executing this process, the function equivalent to the identified virtual master image generating unit 34 of FIG. 1 is provided. Upon completion of the process of S305, the flow goes to S306.

Next, in S306, a process for restoring the display image data 71 that represents the image of the form specified by the user of the display terminal device 300 is executed. Specifically, this process is executed as follows.

Initially, a process for generating the same prediction image as that generated with the motion-compensated inter-frame prediction process executed when the above described differential data generation process of S106 in FIG. 5 is executed. This prediction image can be generated by using the master image data 92 obtained by executing the process of S304, and information of a motion vector within the differential data included in the save data 61 read by executing the process of S301. However, if virtual master image data is generated by executing the process of S305, a process for generating the prediction image is executed by using the virtual master image data as a replacement for the master image data 92.

Next, a process for adding, to the generated prediction image, a prediction error represented by information of a motion-compensated inter-frame prediction error included in the differential data within the save data 61 read by executing the process of S301 is executed.

With the above described process, the display image data 71 is restored. By executing the process of S306, the function equivalent to the form image restoring unit 33 of FIG. 1 is provided.

Next, in S307, a process for causing the display device 86 included in the display terminal device 300 to display the image of the original form, which is represented with the display image data 71 restored by executing the process of S306 is executed. Upon completion of this process, the form image display control process of FIG. 6 is terminated.

The MPU 81 executes the above described form image display control process, whereby the computer 80 of FIG. 3 operates as the display terminal device 300, and data saved in the storage device 200 can be read and the image of the original form represented with the read data can be displayed.

In the form image managing system having the above described configuration of FIG. 2, image data of master images stored in the master image storing units 110, 210 and 310 may be stored, for example, in a state where a data compression process such as the above described JPEG method or the like has been performed. By executing the data compression process, storage capacities of the master image storing units 110, 210 and 310 can be saved. In such a case, original image data is restored by executing a data expansion process when the image data of a master image is read from the master image storing unit 110, 210 or 310.

In the above described configuration of the form image managing system of FIG. 3, the difference generation processing unit 140 generates differential data of the scan data 51 from the master image data 92 by performing motion-compensated inter-frame prediction. Moreover, the display image data generation processing unit 150 generates the same prediction image as that generated with the motion-compensated inter-frame prediction process executed by the differential generation processing unit 140 in order to restore the image of the original form. As a technique of the motion-compensated inter-frame prediction, various types of widely known techniques may be used, and the technique is not limited to the above described one. For example, as the technique of the motion-compensated inter-frame prediction, techniques employed by various types of universal moving picture compression coding methods (such as H.262 standard, H.264 standard or the like standardized by ITU-T (International Telecommunication Union—Telecommunication sector) may be adopted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could made hereto without departing from the spirit and scope of the invention.

What is claimed is:

1. A form image managing system, comprising:
a master image storing unit configured to store a plurality of types of master images;
a form image obtaining unit configured to obtain a form image;
a highly correlated master image searching unit configured to search the master image storing unit for a master image having a highest correlation with the form image obtained by the form image obtaining unit among the plurality of types of master images;
a differential data generating unit configured to generate differential data of the form image, obtained by the form image obtaining unit, from the master image searched by the highly correlated master image searching unit; and
a differential data storing unit configured to associate identification information for identifying the master image, searched by the highly correlated master image searching unit from the plurality of types of master images stored in the master image storing unit, with the differential data generated by the differential data generating unit, and to store the identification information and the differential data.

2. The system according to claim 1, wherein the differential data generating unit performs motion-compensated inter-frame prediction based on the master image, searched by the highly correlated master image searching unit, for the form image obtained by the form image obtaining unit, and generates, as the differential data, information of a motion vector and information of a motion-compensated inter-frame prediction error of the form image from the master image.

3. The system according to claim 1, wherein
the differential data generating unit further executes a data compression process for the generated differential data, and
the differential data storing unit stores the differential data for which the data compression process has been executed by the differential data generating unit.

4. The system according to claim 1, further comprising a new master image storing unit configured to store, in the master image storing unit, a form image where an amount of the differential data generated by the differential data generating unit is equal to or larger than a predetermined threshold value among form images obtained by the form image obtaining unit as the master image.

5. The system according to claim 4, wherein
the differential data generating unit generates differential data of the form image, obtained by the form image obtaining unit, from the new master image when the new master image storing unit stores the new master image in the master image storing unit, and
when the new master image storing unit stores the new master image in the master image storing unit, the differential data storing unit associates identification information for identifying the new master image from the plurality of types of master images stored in the master image storing unit with differential data from the new master image, which is generated by the differential data generating unit, and stores the identification information and the differential data.

6. The system according to claim 1, further comprising:
a differential data reading unit configured to read, from the differential data storing unit, the differential data, and the identification information associated with the differential data;
an identified master image reading unit configured to read, from the master image storing unit, a master image identified with the identification information read by the differential data reading unit; and
a form image restoring unit configured to restore the form image from the differential data read by the differential data reading unit and the master image read by the identified master image reading unit.

7. The system according to claim 1,
further comprising a virtual master image generating unit configured to generate a virtual master image that is a master image represented with a mathematical expression by calculating the mathematical expression,
wherein the differential data generating unit generates, according to a predetermined instruction, differential data of the form image, obtained by the form image obtaining unit, from the virtual master image generated by the virtual master image generating unit, and
wherein the differential data storing unit stores, as the identification information, information for identifying the virtual master image by associating with differential data when the differential data generating unit generates the differential data from the virtual master image.

8. The system according to claim 7, further comprising:
a differential data reading unit configured to read, from the differential data storing unit, the differential data, and the identification information associated with the differential data;
an identified virtual master image generating unit configured to generate a virtual master image identified with the identification information read by the differential data reading unit by performing a same calculation as a calculation performed by the virtual master image generating unit; and
a form image restoring unit configured to restore the form image from the differential data read by the differential data reading unit, and the virtual master image generated by the identified virtual master image generating unit.

9. A form image managing method, comprising:
obtaining, by a processor, a form image;
calculating, by the processor, a mutual correlation coefficient between each of a plurality of types of master images stored in a master image storing unit and the obtained form image based on pixel values of each of the plurality of types of master images and pixel values of the obtained form image;
selecting, by the processor, from the plurality of types of master images a target master image of which the mutual correlation coefficient indicates a maximum positive correlation among the plurality of types of master images;
generating, by the processor, differential data of the obtained form image from the target master image; and
associating, by the processor, identification information for identifying the searched master image with the generated differential data, and storing, by the processor, the identification information and the differential data in a data storing unit.

10. A non-transitory computer readable storage medium on which is recorded a program for causing a computer to execute a process for managing a form image, the process comprising:
obtaining a form image;
calculating a mutual correlation coefficient between each of a plurality of types of master images and the obtained form image based on pixel values of each of the plurality of types of master images and pixel values of the obtained form image;
selecting from the plurality of types of master images a target master image of which the mutual correlation coefficient indicates a maximum positive correlation among the plurality of types of master images;
generating differential data of the obtained form image from the target master image; and
associating identification information for identifying the searched master image with the generated differential data, and storing the identification information and the differential data in a data storing unit.

11. The storage medium according to claim 10, wherein the generating performs motion-compensated inter-frame prediction based on the target master image for the obtained form image, and generates, as the differential data, information of a motion vector and information of a motion-compensated inter-frame prediction error of the target master image for the obtained form image.

12. The storage medium according to claim 10, wherein
the generating executes a data compression process for the generated differential data, and
the associating and storing stores the differential data for which the data compression process has been executed.

13. The storage medium according to claim 10, the process further comprising adding, as a new master image, a form image where an amount of the generated differential data of the obtained form image is equal to or larger than a predetermined threshold value among obtained form images to the plurality of master images.

14. The storage medium according to claim 13, wherein the generating generates differential data of the obtained form image from the new master image when the new master image is added to the plurality of types of master images, and the associating and storing associates identification information for identifying the new master image from the plurality of types of master images with differential data, generated by the generating, from the new master image, and stores the identification information and the differential data, when the new master image is added to the plurality of types of master images.

15. The storage medium according to claim 10, the process further comprising:

reading, from the data storing unit, the differential data, and the identification information associated with the differential data;

obtaining a master image identified with the read identification information from the plurality of types of master images; and restoring the form image from the read differential data and the obtained master image.

16. The storage medium according to claim 10, the process further comprising generating a virtual master image that is a master image represented with a mathematical expression by calculating the mathematical expression, wherein the generating generates differential data of the obtained form image from the virtual master image that is the target master image according to a predetermined instruction, and the associating and storing stores, as the identification information, information for identifying the virtual master image by associating with the differential data when the differential data from the virtual master image is generated.

17. The storage medium according to claim 16, the process further comprising:

reading, from the data storing unit, the differential data, and the identification information associated with the differential data;

generating a virtual master image identified with the read identification information by calculating a same mathematical expression as a mathematical expression for generating the virtual master image; and restoring the form image from the read differential data and the generated virtual master image.

* * * * *